United States Patent
Delele et al.

(10) Patent No.: US 9,314,040 B2
(45) Date of Patent: Apr. 19, 2016

(54) STORAGE OF RESPIRATORY PRODUCE

(75) Inventors: Mulugeta Admasu Delele, Stellenbosch (ZA); Bart Nicolai, Heusden-Zolder (BE); Pieter Verboven, Herent (BE); Bert Verlinden, Aarschot (BE)

(73) Assignees: KATHOLIEKE UNIVERSITEIT LEUVEN, Leuven (BE); VLAAMS CENTRUM VOOR BEWARING VAN TUINBOUWPRODUCTEN, Leuven (BE)

( * ) Notice: Subject to any disclaimer, the term of this patent is extended or adjusted under 35 U.S.C. 154(b) by 447 days.

(21) Appl. No.: 13/635,473

(22) PCT Filed: Mar. 17, 2011

(86) PCT No.: PCT/EP2011/054088
§ 371 (c)(1),
(2), (4) Date: Sep. 17, 2012

(87) PCT Pub. No.: WO2011/113915
PCT Pub. Date: Sep. 22, 2011

(65) Prior Publication Data
US 2013/0013099 A1    Jan. 10, 2013

(30) Foreign Application Priority Data

Mar. 17, 2010 (GB) .................................. 1004359.4
Jun. 25, 2010 (GB) .................................. 1010704.3

(51) Int. Cl.
*A01J 11/04* (2006.01)
*A23B 7/148* (2006.01)

(52) U.S. Cl.
CPC ...................................... *A23B 7/148* (2013.01)

(58) Field of Classification Search
CPC ........................................................ A23B 7/148
USPC ......... 99/325, 476, 473; 435/69.1, 69.4, 69.7, 435/69.6, 69.51
See application file for complete search history.

(56) References Cited

U.S. PATENT DOCUMENTS 4,710,206 A    12/1987    Allen et al.
5,333,394 A    8/1994    Herdeman et al.
(Continued)

FOREIGN PATENT DOCUMENTS

EP    0457431 A2    4/1991
EP    2092831 A1    1/2008
(Continued)

OTHER PUBLICATIONS

First Examination Report in Application No. 602194 in New Zealand (Jul. 9, 2013).
(Continued)

*Primary Examiner* — Phuong Nguyen
(74) *Attorney, Agent, or Firm* — Bacon & Thomas, PLLC

(57) ABSTRACT

A method and system for storage of respiratory produce includes a storage environment, a gas analyze, a $CO_2$ scrubber, a gas sampling pump, a gas pump for the scrubber, an air supply, an $N_2$ supply and valves for flow control. The control system is a software assisted measurement system and control algorithm that takes into account the gas exchange dynamics of both the produce and the storage environment and a mathematical model for determining the actual respiratory and fermentative rates of the produce. The system is suitable for low oxygen storage of respiratory produce.

17 Claims, 9 Drawing Sheets

(56) References Cited

U.S. PATENT DOCUMENTS

| | | | |
|---|---|---|---|
| 6,092,430 | A | 7/2000 | Liston et al. |
| 6,615,908 | B1 | 9/2003 | Bosher et al. |
| 7,208,187 | B2 | 4/2007 | Gabler |
| 2003/0113239 | A1* | 6/2003 | Pahlman et al. ............... 422/171 |
| 2003/0150334 | A1* | 8/2003 | Gbler ............................. 99/325 |
| 2007/0144638 | A1* | 6/2007 | Fernandez et al. ............ 149/115 |

FOREIGN PATENT DOCUMENTS

| | | |
|---|---|---|
| WO | 91/11913 A1 | 8/1991 |
| WO | 96/18306 A2 | 6/1996 |
| WO | 0206795 A2 | 1/2002 |

OTHER PUBLICATIONS

Christopher W. Yearsley et al., "Determination of lower oxygen limits for apple fruit," Postharvest Biology and Technology 8 (1996) 95-109, Accepted Oct. 3, 1995., Elsevier Science B.V. 1996, pp. 96-109.

R.M. Beaudry, "Erratum to "Effect of O2 CO2 partial pressure on selected phenomena affecting fruit and vegetable quality," [Postharvest Biology and Technology 15 (1999) 293-303]", Postharvest Biology and Technology 16 (1999) 199, Department of Horticulture, Michigan State University, East Lansing, MI, USA., Elsevier Science B.V. 1999, pp. 68-76.

H.W. Peppelenbos et al., "A Theoretical Approach on the Role of Fermentation in Harvested Plant Products," Acta Horticulturae 464 (1998); Postharvest 96, R.L. Bieleski, W.A. Laing, C.J. Clark, Editors, pp. 381-386.

John M. DeLong et al., "Chlorophyll Fluorescence-Based Low-O2 CA Storage of Organic 'Cortland' and 'Delicious Apples,'" Proc. 1st IS on Organic Apple and Pear, Eds.: D. Lynch and R. Prange, Acta Hort. 737, ISHS 2007, pp. 31-37.

Mikal E. Saltveit, "Is it possible to find an optimal controlled atmosphere?" Department of Vegetable Crops, Mann Laboratory, University of California Davis, CA 95616-8631, USA, Received Nov. 25 2001; Accepted May 2002, Postharvest Biology and Technology 27 (2003) 3-13, Elsevier Science B.V. 2002, pp. 3-13.

R.H. Veltman et al., "Dynamic control system (DCS) for apples (Malus domestica Borkh cv. 'Elstar'): optimal quality through storage based on product response," Agro-technological Research Institute (ATO), The Netherlands, Received Nov. 6, 2001; Accepted Jul. 11, 2002, Postharvest Biology and Technology 27 (2003) 79-86, Elsevier Science B.V. 2002, pp. 79-86.

J.T. Baker et al., "A method for estimating carbon dioxide leakage rates in controlled environment chambers using nitrous oxide," Environmental and Experimental Botany 51 (2004) 103-110, Received Apr. 22, 2003 (revised form received Jul. 23, 2003); Accepted Aug. 4, 2003, Elsevier B.V., pp. 103-110.

James A. Bartsch, "CA Room Testing," 2004 Cornell Handling and Storage Newsletter, 16-20, 2004, pp. 1-20.

A. Zanella et al., "Dynamic Controlled Atmosphere (DCA) Storage by the Means of Chlorophyll Fluorescence Response for Firmness Retention in Apple," Agricultural Research Centre Laimburg Ora (BZ) Italy, Proc. IC on Ripening Reg. and Postharv. Fruit Quality, Eds.:J. Streifand R. McCormick, Acta Hort. 796, ISHS 2008, pp. 77-82.

F. Gasser et al., "Control of the Critical Oxygen Level during Dynamic CA Storage of Apples by Monitoring Respiration as Well as Chlorophyll Fluorescence," Agroscope Changins-Wadenswil, Research Station ACW, Wadenswil, Switzerland, Proc. IC on Ripening Reg. and Postharv. Fruit Quality, Eds.: J. Streif and R. McCormick, Acta Hort. 796, ISHS 2008, pp. 69-76.

Ernst Hoehn et al., Modified and Controlled Atmospheres for the Storage, Transportation, and Packaging of Horticultural Commodities, CRC Press, 42, 2009, Storage Technology and Applications.

G.S.V. Raghavan et al., "Processing Fruits," CRC Press, 23-52, 2005 (D.M. Barret, L. Somogy, H. Ramaswamy), Refrigerated and Controlled/Modified Atmosphere Storage.

European Office Action from the Epo in corresponding EP 11 708 501.9, dated Jan. 2, 2014.

International Search Report and Written Opinion received for PCT/EP2011/054088, dated Jul. 15, 2011.

International Preliminary Report on Patentability received for PCT/EP2011/054088, dated Jun. 28, 2012.

Examination Report received for GB 1010704.3, Oct. 26, 2010.

\* cited by examiner

STORAGE OF RESPIRATORY PRODUCE

FIELD OF THE INVENTION

This invention concerns a dynamic method and system for storage of respiratory produce and it generally relates to the algorithmic control of gas composition in the atmosphere of confined environments, for instance storage environments, of respiratory produce, such as fruits, vegetables and plants. More particularly, it relates to a method and apparatus to dynamically control the gas composition in the storage environment through a software-assisted monitoring of the rates of oxygen consumption and carbon dioxide change in a system where the produce can be stored over prolonged periods of time. Such system advantageously may comprise a mathematical model that determines the actual respiratory and fermentative rates of the produce.

BACKGROUND OF THE INVENTION

Respiratory produce (fruit, vegetables and plants) are commonly stored at a low temperature (typically close to 0° C.) in combination with a reduced $O_2$ and increased $CO_2$ partial pressure (so-called "Controlled Atmosphere (CA) storage") to reduce their respiration rate, and, hence, extend their storage life. However, the optimal gas composition is critical, as too low an $O_2$ partial pressure in combination with too high a $CO_2$ partial pressure induces a fermentative metabolism in the fruit (Beaudry, Postharvest Biol Technol, 15: 293-303, 1999). This causes off-flavours (e.g., ethanol) and storage disorders (e.g., browning and core breakdown). For this reason, the $O_2$ and $CO_2$ partial pressure in commercial cool stores is kept at a safe and steady value. Such systems have been developed under U.S. Pat. No. 5,333,394, "Controlled atmosphere container system for perishable products", U.S. Pat. No. 6,092,430, "Oxygen/carbon dioxide sensor and controller for a refrigerated controlled atmosphere shipping container" and U.S. Pat. No. 6,615,908, "Method of transporting or storing perishable product". These patents dealt with atmosphere control, use of membranes and use of sensors. US Patent application US2007/0144638 was positioned as an improvement over these systems, being more economical (energy efficient) and not resulting in increased pressure in the containers (due to the regulation of the gases of the then current methods). European Patent EP0457431 describes a system for controlling oxygen and carbon dioxide concentrations in a refrigerated container for respiring perishables to dynamically and continuously control the gas concentrations. European Patent application EP2092831 describes a similar system. All these methods aim at obtaining predetermined values of gas concentrations. U.S. Pat. No. 5,333,394 describes a CA container with a controller that will implement bursts of gas supply which are preprogrammed based upon a particular application; it does not use measured gas production and consumption rates.

Further, U.S. Pat. No. 7,208,187 discloses a control method of a controlled atmosphere where at least one trace gas in a concentration of less than 1% is measured at least at two different times, and where the control variables are determined on the rate of change in the concentration of the trace gas, which is then used as a measure of the production rate of the trace gas. The referred gasses are ethylene, ethanol, ethane, acetaldehyde and carbon dioxide. The method does not consider gasses that are consumed due to respiration, i.e. oxygen. The method does also not consider the proportion of the rate of change of two gasses as a measure of physiological state.

Conventionally, controlled atmosphere (CA) storage of respiratory produce thus uses static, fixed set-points that are recommended as optimal storage conditions. As the concentrations are set at safe levels, significant firmness loss may still occur. In addition, the development of postharvest disorders, even under optimal CA, has been reported (Peppelenbos & Oosterhaven, Acta Hort 464: 381-386, 1998; DeLong et al., Acta Hort 737: 31-37, 2007). Due to the high biological variability of horticultural products the recommended optimal storage conditions may be different from the real optimal storage condition (Saltveit, Postharvest Biol Technol 27: 3-13, 2003; Veltman et al., Postharvest Biol Technol 27: 79-86, 2003).

Adaptive CA (ACA) storage systems can adapt the atmospheric gas composition based on the actual physiological state of the fruit (Veltman et al., Postharvest Biol Technol 27: 79-86, 2003; Zanella et al., Acta Hort 796, 77-82, 2008) as a function of fruit batch and time, such that variations due to factors such as geographical location, cultivar, mutant, orchard effects, harvest date and storage duration, can be taken into account. ACA storage can maintain fruit quality to a greater extent than conventional CA and Ultra low oxygen (ULO) storage facilities (Gasser et al., Acta Hort 796 69-76: 2008; Zanella et al., Acta Hort 796, 77-82, 2008), and has been proposed as a viable option for organic apple producers who are not using preventive chemicals (DeLong et al., Acta Hort 737: 31-37, 2007). Veltman et al. Postharvest Biol Technol 27: 79-86 (2003) showed that ACA resulted in quality improvement of 'Elstar' apples, with better firmness retention and inhibition of the 'skin spots' defect. Other applications of ACA have been successful for storage of apple cultivars 'Granny Smith' and 'Delicious' (Hoehn et al., In (M. M. Yahia): Modified and Controlled Atmospheres for the Storage, Transportation, and Packaging of Horticultural Commodities, CRC Press, 42, 2009).

Monitoring systems for ACA have been developed based on chlorophyll fluorescence (Prange et al., international patent application N° WO02/06795) and monitoring the release of acetaldehyde or ethanol (Veltman et al., 2003).

The principle behind ACA storage is storage of fruit in an atmosphere with the lowest possible oxygen level that is tolerated by the fruit. Below this level fermentation becomes important and physiological disorders such as internal browning may develop. In practice, a fruit response signal which is generated under such conditions is used for monitoring oxygen stress. Two systems are already in use. Systems using chlorophyll fluorescence as the fruit response signal have been disclosed in International patent application WO02/06795. Controlled Atmosphere (CA) using chlorophyll fluorescence requires several expensive sensors per cool room, and has methodological constraints such as measurement position (a constant distance of the sensor to apples is required). Veltman et al. Postharvest Biol Technol 27: 79-86 (2003) used fermentative ethanol production as the fruit response signal. Ethanol measurements are conducted off-line in sampled fruits from the storage room or from the room air. The ethanol based system is disclosed in international patent application WO02/06795 and European patent EP0798962. The former method is a procedure that does not match the characteristics of a dynamic commodity indicator as part of an automated control system. The latter is unreliable due to possible interaction of the detection equipment with gasses such as ethylene, which may be present in the sample air (Hoehn et al., In (M. M. Yahia): Modified and Controlled Atmospheres for the Storage, Transportation, and Packaging of Horticultural Commodities, CRC Press, 42, 2009).

Both methods have been benchmarked against respiration measurements. The onset of stressful conditions indicated by increased ethanol concentration or chlorophyll fluorescence signal concurs with the lowest acceptable respiration rate, which can be obtained by measuring the changes of $O_2$ oxygen and/or $CO_2$ concentration in the atmosphere around the fruit (Veltman et al. Postharvest Biol Technol 27: 79-86, 2003; Gasser et al., Acta Hort 796: 69-76, 2008). Measurement of respiration rate in storage rooms has not been found practical (Hoehn et al., In (M. M. Yahia): Modified and Controlled Atmospheres for the Storage, Transportation, and Packaging of Horticultural Commodities, CRC Press, 42, 2009).

Yearsly et al., Postharvest Biol Technol 8: 95-109 (1996) and Gasser et al., Acta Hort 796: 69-76 (2008) demonstrated on small batches of apples in jars that the respiration coefficient RQ (rate of $CO_2$ production per rate of consumption of $O_2$) increases drastically below the lowest respiration rate, due to the onset of fermentation. This demonstrated that RQ concurs with chlorophyll fluorescence and ethanol methods.

Jar experiments in the laboratory however exclude important influencing factors of actual storage rooms (size and shape of the room, leakages, climate conditions, stacking pattern, storage of gasses inside the fruits) that prevent exact determination of RQ, and therefore make accurate control in real systems impossible. In particular, jars provide an air-tight system that excludes leakages and can be controlled to prevent temperature and pressure fluctuations.

In containers, chambers or rooms, accurately determining gas leakage rates is essential for correcting measurements of physiological processes such as respiration and fermentation (Hoehn et al., In (M. M. Yahia): Modified and Controlled Atmospheres for the Storage, Transportation, and Packaging of Horticultural Commodities, CRC Press, 42, 2009). Existing methods use non-reacting tracer gasses for this purpose in separate tests (Baker et al., Environ Exp Bot 51: 103-110, 2004) or pressure decay in empty rooms at ambient temperature (Bartsch, Cornell Fruit Handling and Storage Newsletter, 16-20, 2004; Raghaven et al., In (D. M. Barett, L. Somogy, H. Ramaswamy): Processing Fruits, CRC Press, 23-52, 2005). Leakage is dependent on room design and construction, climate conditions, load, and changes with time. Yearly tests are recommended (Hoehn et al., In (M. M. Yahia): Modified and Controlled Atmospheres for the Storage, Transportation, and Packaging of Horticultural Commodities, CRC Press, 42, 2009).

There is still need for improvement of storage rooms and control systems thereof.

SUMMARY OF THE INVENTION

It is an object of embodiments of the present invention to provide good control methods and systems for controlling storage of respiratory produce. It is an advantage of embodiments according to the present invention that systems and methods are provided allowing dynamic control of storage of respiratory produce. It is an advantage of embodiments according to the present invention that systems and methods are provided allowing pro-active control of storage of respiratory produce. Such pro-active control of storage of respiratory produce may allow for improved storage.

It is an advantage of embodiments according to the present invention that methods and systems are provided that perform control based on the gas exchange rate coefficient GERQ taking into account the gas exchange dynamics of the produce as well as the gas exchange dynamics of the storage environment.

It is an advantage of embodiments according to the present invention that methods and systems are provided that perform control based on a mathematical model that calculates the respiration and fermentation rates of the produce and the gas exchange rate of the storage system with the external environment.

It is an advantage of embodiments according to the present invention that methods and systems are provided that allow self-learning, without the need for prior measurements on the produce or the storage system. The control parameters are determined as a part of the control algorithm.

It is an advantage of embodiments according to the present invention that methods and systems are provided allowing automatically adapting the gas concentrations in the storage environment when changes occur in the respiratory behavior of the produce, when the amount of produce in the storage environment changes, when gas and temperature conditions in the storage environment changes, or when the design or structure of the storage environment changes.

It is an advantage of embodiments according to the present invention that the control system can be applied to any respiratory produce and any storage system.

The control system is not limited by constraints on temperature, humidity, gas concentrations, the amount and type produce, or the dimensions of the storage environment.

It is an advantage of embodiments according to the present invention that systems and methods are provided allowing for automatic measurement of leakage thus allowing a reduced workload, automation of the storage room management and an implementation of a dynamic controlled atmosphere (DCA).

It is an advantage of embodiments according to the present invention that systems and methods are provided allowing for automatically correcting for the effect of leakage, without the need for additional systems or tests.

It is an advantage according to embodiments of the present invention that systems and methods are provided for automatic measurement of the respiration coefficient (RQ) allowing reduction of the workload and automated storage room management.

It is an advantage of embodiments according to the present invention that atmosphere control can be performed dynamically, thus resulting in a dynamic controlled atmosphere rather than an adjusted controlled atmosphere.

It is an advantage of embodiments according to the present invention that methods and systems using a control paradigm are provided, the control paradigm using the total gas exchange rate quotient (GERQ) in the storage environment and determining by means of a mathematical model of the system the actual respiratory rate of the product.

It is an advantage of embodiments according to the present invention that dynamic and accurate measurement of $O_2$ and $CO_2$ levels as a function of time in the room are used as well as the rate of gas exchanges with the external environment and accumulation of the gasses are taken into account for dynamic control of CA storage environments.

The above objective is accomplished by a method and device according to the present invention.

The present invention relates to a control system for controlling the storage of respiratory produce in a defined confined storage environment, said control system comprising at least one gas analyzing means for determining an adjusted gas medium composition of the confined storage environment, the at least one gas analyzing means comprising a control unit, and the control system comprising at least one operating/actuating means for adapting the gas medium in the confined storage environment based on said determined adjusted gas medium composition, wherein the control unit is adapted for determining the adjusted gas medium composition based on a mathematical model of the system that determines the actual respiratory and fermentative rates of the produce and on the evaluation of the gas exchange dynamics of the storage system comprising the gas exchange dynamics of the respiratory produce, the storage atmosphere and the outside.

The control unit may be adapted for determining the adjusted gas medium composition as a function of the proportion of measured levels of the rate of change of concentration of carbon dioxide in the storage environment to the rate of change of concentration of oxygen in the storage environment.

The control unit may be adapted for determining the adjusted gas medium composition as a function of the calculated total gas exchange rate quotient (GERQ) in the confined storage environment.

The control unit may be adapted for continuously determining the adjusted gas medium composition using said mathematical by evaluation of the physiological state of the respiratory produce by the mathematical model of respiration and fermentation of the produce in the storage system combined with continuously and dynamically measured rates of change of concentrations of carbon dioxide and oxygen and taking into account the complete storage system including the storage atmosphere and the outside, e.g. gas leakage to or from the outside.

The control unit may be adapted for determining the adjusted gas medium composition taking into account measured levels of the rate of gas exchanges of the confined storage environment with the external environment and the accumulation of the gasses in said respiratory produce.

The control unit may be adapted for comparing the calculated GERQ to the set point value of GERQ, its integral or its differential and wherein the control unit is adapted for comparing the $CO_2$ level to the maximum tolerable concentration of the fruit.

The control unit may be adapted for comparing the calculated GERQ to the set point value of GERQ, its integral or its differential and wherein the control unit is adapted for comparing the $O_2$ level to the minimal tolerable concentration of the fruit.

The at least one gas analyzing means may comprise sensing means for sensing values of $O_2$ concentration and for sensing values of $CO_2$ concentration and is adapted for providing a signal from the control unit for controlling said operating/actuating means for providing the produce with a defined atmospheric medium.

The control unit may be adapted for automatically calculating the future gas composition required to maintain the respiration of the produce at safe levels and for providing a control signal from the control unit for controlling the storage room operating or actuating means for adapting the gas composition and/or for applying an automated control of gas composition in the storage environment.

The control unit may be adapted for predicting the fermentation.

The control unit may be based on a software assisted measurement system and control algorithm.

The control unit may comprise a model predictive control (MPC) for automatically calculating the future gas composition required to maintain the respiration of the produce at safe levels.

The control unit may comprise a PID controller for automatically calculating the future gas composition required to maintain the respiration of the produce at safe levels.

The operating or actuating means for adapting the gas composition in the confined storage environment may comprise a means for flowing a gas into said the confined storage environment and/or a means for scrubbing a gas (e.g. $CO_2$) from said confined storage environment.

The gas analyzing means may be adapted for evaluating the gas exchange dynamics of the complete storage system comprising the respiratory produce, the storage atmosphere, the room design and the gas leakage to the outside.

Variation due factors for variation of the respiratory produce may be one or more of the group consisting of respiratory produce batch, confined environment conditions, time, geographical location, cultivar, cultivar strain, harvest date and storage duration.

The control system may comprise valves for flow control, e.g. being part of the operating/actuating means.

The gas analyzing means and operating or actuating means may be adapted for providing an automated control of gas composition in the storage environment.

The system may be stable to changes in the air-tightness and temperature of the storage environment and changes in the ripening stage of the respiratory produce.

The control system may be adapted for measuring $O_2$ and $CO_2$ concentrations in the storage environment as a function of time and for adapting the $O_2$ and $CO_2$ concentration in the confined environment by the flow of oxygen into the confined storage environment, by flushing the storage environment with nitrogen gas, by scrubbing $CO_2$ and/or by respiration of the produce, using the measurement of storage environment leaks and the instantaneous total gas exchange rate quotient (GERQ) and using the rate of change with time of GERQ, whereby GERQ is calculated as $$GERQ = \frac{\left(\frac{dCO_2}{dt} + k\Delta CO_2\right)}{\left(-\frac{dO_2}{dt} + k\Delta O_2\right)}$$

in aerobic conditions and anaerobic conditions, whereby $$\frac{d}{dt}$$

is the rate of change with time t, $O_2$ and $CO_2$ are the oxygen and carbon dioxide concentration, k the leak transfer rate constant, characteristic of the storage environment at the time of storage, and $\Delta O_2$ or $\Delta CO_2$ the difference of $O_2$ and $CO_2$ in the storage room and the environment, respectively.

The control system also may comprise the storage environment, at least one $CO_2$ scrubber, at least one gas sampling pump, at least one gas pump for the scrubber, at least one air supply, at least one $N_2$ supply and valves for flow control.

The at least one gas analyzing means may be adapted for measuring, when operational, $O_2$ (a) and $CO_2$ (b) concentrations, whereby the measured $O_2$ and $CO_2$ results are used to calculate GERQ and the calculated GERQ is compared to the maximum allowable value of GERQ (c) and whereby an air supply valve and/or a scrubber and at least one gas pump (d) is used to reduce the $O_2$ level in the storage environment or increase the $CO_2$ level so while $GERQ<GERQ_{max}$ or $dGERQ/dt<(dGERQ/dt)_{max}$ (subscript s stands for the maximal value)

The control system may be adapted for regenerating the at least one $CO_2$ scrubber by $N_2$ flushing.

The confined storage environment may be of the group consisting of a room, a container, a box, a bin, a bag, a pallet bag, a conditioned storage deck on a ship, a conditioned trailer and a truck.

The present invention relates in one aspect to a control system for controlling the storage of respiratory produce, particularly fruit, vegetables and plants, in a defined confined storage environment in each case of variation factor on respiratory produce, on confined environment condition and/or storage time, whereby said control system comprises at least one operator or actuator means to adapt the gas composition in the confined storage environment, at least one gas analyzing means for determining an adjusted gas medium of the confined storage environment and at least one control unit having a computer readable medium tangibly embodying computer code executable on a processor, characterized in that said adjusted gas medium being determined by systems evaluation of the gas exchange dynamics of the complete storage system including the gas exchange dynamics of respiratory produce, the storage atmosphere and the outside (gas leakage to the outside).

The present invention in one aspect further relates to a control system for controlling the storage of respiratory produce, particularly fruit, vegetables and plants, in a defined confined storage environment in each case of variation factor on respiratory produce, on confined environment condition and/or storage time, wherein said control system comprises at least one operator or actuator means to adapt the gas composition in the confined storage environment, at least one gas analyzing means for determining an adjusted gas medium of the confined storage environment and at least one control unit having a computer readable medium tangibly embodying computer code executable on a processor of said system, characterized in that adjusted gas medium is being determined as a function of the proportion of rate of removal of carbon dioxide by the produce into the storage environment to the rate of uptake of oxygen by the produce from the storage environment.

The present invention in another aspect also relates to a control system for controlling the storage of respiratory produce, particularly fruit, vegetables and plants, in a defined confined storage environment in each case of variation factor on respiratory produce, on confined environment condition and/or storage time, whereby said control system comprises at least one operator or actuator means to adapt the gas composition in the confined storage environment, at least one gas analyzing means for determining an adjusted gas medium of the confined storage environment and at least one control unit having a computer readable medium tangibly embodying computer code executable on a processor of said system, characterized in that adjusted gas medium is being determined as a function of the calculated total gas exchange rate quotient (GERQ) in the confined storage environment.

The adjusted gas medium may be determined by or taking into account measured levels of $O_2$ and $CO_2$ as a function of time, by the rate of gas exchanges with the external environment and by the accumulation of the gasses in said respiratory produce.

The calculated GERQ may be compared to a set point value of GERQ or its differential and the $CO_2$ level may be compared to the maximum tolerable concentration of the fruit.

The adjusted gas medium may be determined by means of a mathematical model of the system that also determines the actual respiratory rate of the product.

The control system may be for controlling the storage of respiratory produce, particularly fruit, vegetables and plants, in a defined confined storage environment in each case of variation factor on respiratory produce, on confined environment condition and/or storage time, whereby said control system comprises operators or actuator means to adapt the gas composition in the confined storage environment, further comprises at least one gas analysing means for determining an adjusted gas medium of the confined storage environment and further a control unit having a computer readable medium tangibly embodying computer code executable on a processor of said system.

The control system may be for controlling the storage of respiratory produce, particularly fruit, vegetables and plants, in a defined confined storage environment in each case of variation factor on respiratory produce, on confined environment condition and/or storage time, whereby the system comprising at least one actuator means to adapt the gas composition in the confined storage environment controlled by said control unit, at least one gas analyzing means for sensing values of $O_2$ concentration (a) and for sensing values of $CO_2$ concentration (b) for provided a signal to said the control unit having a computer readable medium tangibly embodying computer code executable on a processor of said system for controlling said operator or actuator means to provide the produce with a defined atmospheric medium required.

The controller may automatically calculate the future gas composition required to maintain the respiration of the produce at safe levels and advises storage room operators to adapt the gas composition, or applies an automated control of gas composition in the storage environment.

The controller may be programmed for predicting the fermentation.

The control unit or controller may be based on a software assisted measurement system and control algorithm.

The control unit may comprise a model based controller (MPA) to automatically calculate the future gas composition required to maintain the respiration of the produce at safe levels.

The control unit may comprise a PID controller to automatically calculate the future gas composition required to maintain the respiration of the produce at safe levels.

The operator or actuator means to adapt the gas composition in the confined storage environment may be a means for flowing a gas into said the confined storage environment, e.g. an air supply or $O_2$ supply and/or $N_2$ supply and/or a means for scrubbing a gas (e.g. $CO_2$) from said the confined storage environment.

The gas analyzing means may evaluate the gas exchange dynamics of the complete storage system, including the respiratory produce, the storage atmosphere, the room design and the gas leakage to the outside.

The variation due factors may comprise one or more of the group of respiratory produce batch, time, geographical location, cultivar, cultivar strain, harvest date and storage duration.

The control system may comprise valves for flow control.

The gas analyzing means may provide an automated control of gas composition in the storage environment.

The system may be stable to or controllable in case of changes in the air-tightness and temperature of the storage environment and changes in the ripening stage of the respiratory produce.

The control system may be adapted for measuring $O_2$ and $CO_2$ concentrations in the storage environment, as a function of time and may be adapted for adjusting the $O_2$ and $CO_2$ concentration in the confined environment by introducing oxygen into the confined storage environment, by flushing the storage environment with nitrogen gas, by scrubbing $CO_2$ and/or by respiration of the produce using the measurement of storage environment leaks and the instantaneous total gas exchange rate quotient (GERQ) and using the rate of change with time of GERQ, whereby GERQ is calculated as $$GERQ = \frac{\left(\frac{dCO_2}{dt} + k\Delta CO_2\right)}{\left(-\frac{dO_2}{dt} + k\Delta O_2\right)}$$

in aerobic conditions and anaerobic conditions, whereby $$\frac{d}{dt}$$

is the rate of change with time t, $O_2$ and $CO_2$ are the oxygen and carbon dioxide concentration and k the leak transfer rate constant, characteristic of the storage environment at the time of storage.

The control system may furthermore comprise a storage environment, at least one gas analyzing means, at least one $CO_2$ scrubber, at least one gas sampling pump, at least one gas pump for the scrubber, at least one air supply, at least one $N_2$ supply and valves for flow control.

When operational, the at least one gas analyzing means may measure $O_2$ and $CO_2$ concentrations, whereby the measured $O_2$ and $CO_2$ results may be used to calculate GERQ and the calculated GERQ is compared to the set point value of GERQ and whereby an air supply valve may be used to maintain the required $O_2$ level in the storage environment, so that $GERQ < GERQ_S$ or $dGERQ/dt < (dGERQ/dt)$, (subscript stands for the set point) and the $O_2$ concentration is higher than the optimum storage concentration that is recommended for the static storage environment and whereby if the $CO_2$ concentration is larger than the set point value of $CO_2$ (d), the gas from the storage environment is circulated through the scrubber using the at least one gas pump, until it reaches the required $CO_2$ concentration.

The at least one $CO_2$ scrubber may be regenerated by $N_2$ flushing.

The confined storage environment may be of the group consisting of a room, a container, a box, a bin, a bag, a pallet bag, a conditioned storage deck on a ship, a conditioned trailer and a truck.

The present invention also relates to the use of a control system as described herein for accurately monitoring the respiration activity of the produce.

The present invention also relates to the use of a control system as described herein for controlling the oxygen concentration dynamically to the lowest possible value allowed by respiratory produce.

The present invention also relates to the use of a control system as described herein for protecting the stored respiratory produce against fermentative degradation.

The present invention also relates to the use of a control system as described herein for modifying the storage environment to a suitable level for the particular batch of fruits in the storage environment as it changes with the storage time.

The present invention also relates to the use of a control system as described herein for dynamically controlling the gas composition in the atmosphere of confined storage environment.

The present invention also relates to the use of a control system as described herein for dynamically controlling through a software-assisted monitoring of the rates of oxygen consumption and carbon dioxide change.

The present invention also relates to a method of monitoring and controlling a process of storage of a respiratory produce for monitoring and controlling the respiration activity of the produce, the method comprising determining an adjusted gas medium for the confined storage environment based on a mathematical model of the system that determines the actual respiratory and fermentative rate of the produce and on the evaluation of the gas exchange dynamics of the storage system comprising the gas exchange dynamics of the respiratory produce, the storage atmosphere and the outside and using said determined adjusted gas medium for controlling of gas composition in the storage device.

The method may comprise automatically calculate the future gas composition required to maintain the respiration of the produce at safe levels.

The method may comprise using said mathematical model for automatically monitoring the total gas exchange rate quotient (GERQ) taking into account factors of room design and operation.

Using said determined adjusted gas medium for controlling of gas composition in the storage device may comprise automated controlling of the gas composition in the storage device.

The method may comprise measuring $O_2$ and $CO_2$ levels as a function of time in the confined storage environment, measuring the rate of gas exchanges with the external environment and measuring of the accumulation of the gasses for determining the actual respiratory rate of the produce.

The method may comprise measuring $O_2$ and $CO_2$ levels as a function of time in the confined storage environment, measuring the rate of gas exchanges with the external environment and measuring of the accumulation of the gasses for determining the total gas exchange rate quotient (GERQ) in the storage environment and RQ (rate of $CO_2$ production per rate of consumption of $O_2$).

The present invention furthermore relates to a method of monitoring and controlling a process of storage of a respiratory produce (e.g. fruits, vegetables or other plants crops) for accurately monitoring and/or controlling the respiration activity of the produce whereby the method comprises the steps of:

evaluation of the gas exchange dynamics of the complete storage system (e.g. including the fruit, the storage atmosphere, the room design and the gas leakage to the outside) for automatic monitoring the total gas exchange rate quotient (GERQ) that takes into account factors of room design and operation and automatically calculating the future gas composition required to maintain the respiration of the produce at safe levels and to automated control of gas composition in the storage environment by advising storage room operators to adapt the gas composition.

The method may comprise measuring of $O_2$ and $CO_2$ levels as a function of time in the confined storage environment, measuring the rate of gas exchanges with the external environment and measuring of the accumulation of the gasses for determining by means of a mathematical model the actual respiratory rate of the product.

The method may comprise measuring $O_2$ and $CO_2$ levels as a function of time in the confined storage environment, measuring the rate of gas exchanges with the external environment and measuring of the accumulation of the gasses for determining by means of a mathematical model the total gas exchange rate quotient (GERQ) in the storage environment and RQ (rate of $CO_2$ production per rate of consumption of $O_2$). Embodiments of the present invention include a system and associated instrumentation for automatic monitoring GERQ that takes into account factors of room design and operation. Embodiments of the present invention clearly demonstrate that the evaluation of the gas exchange dynamics of the complete storage system (including the fruit, the storage atmosphere, the room design and the gas leakage to the outside) taking into account climate conditions provides a means to accurately monitor the respiration activity of the produce. Embodiments of the present invention allow also to automatically calculate the future gas composition required to maintain the respiration of the produce at safe levels. Embodiments of the present invention result in systems providing information or advice for storage room operators to adapt the gas composition, or providing automated control of gas composition in the storage environment.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Thus, the claims following the detailed description are hereby expressly incorporated into this detailed description, with each claim standing on its own as a separate embodiment of this invention.

Figure 1:
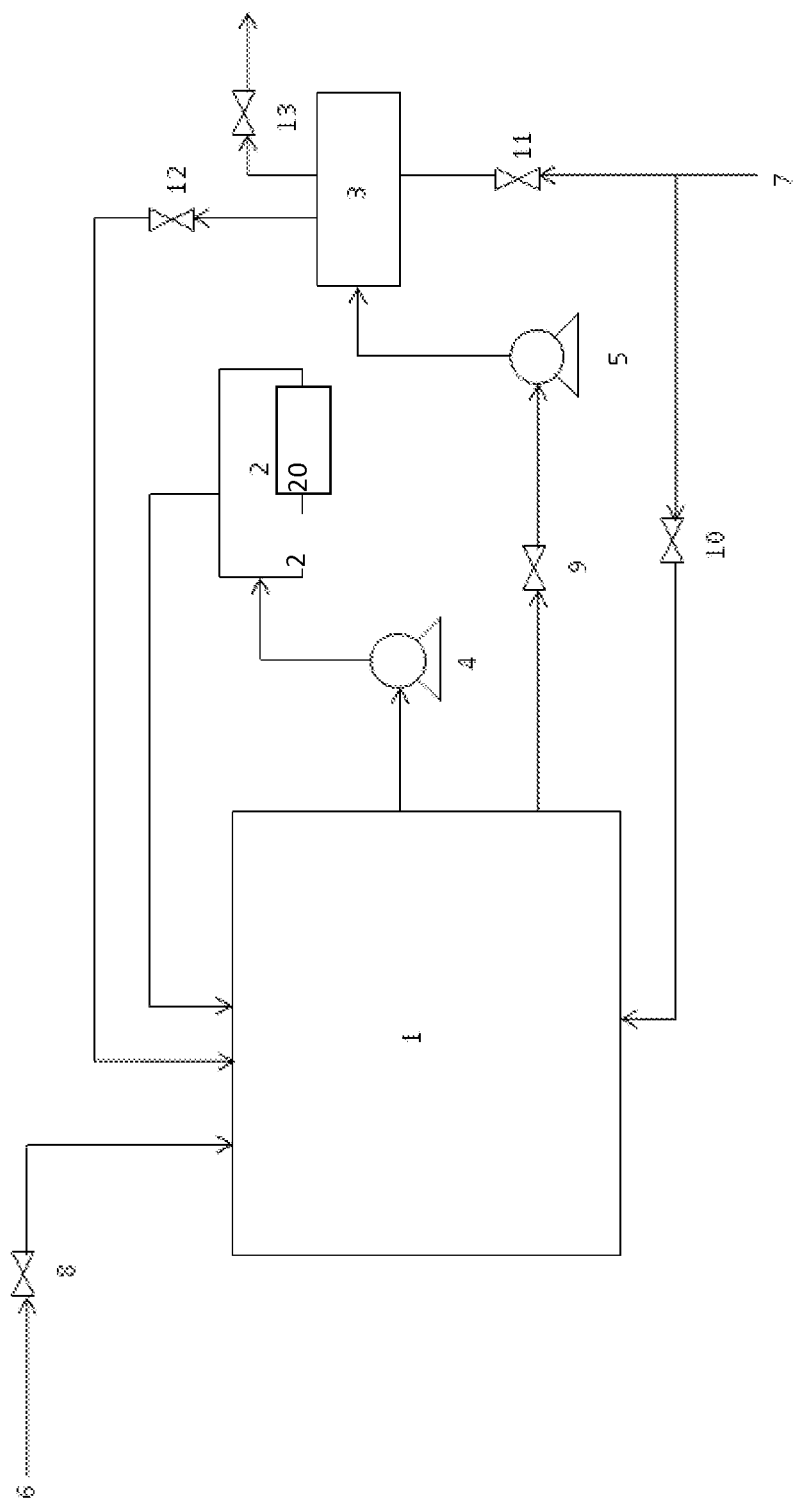
FIG. 1 is a schematic view showing an exemplary control system for dynamic controlled atmosphere storage of respiratory produce, with the storage environment (1), a gas analyzing means (2), a $CO_2$ scrubber (3), a gas sampling pump (4), a gas pump for the scrubber (5), an air supply (6), an $N_2$ supply (7) and valves for flow control (8-13), according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

Where in embodiments of the present invention reference is made to "respiratory produce.", reference is made to is a complete living system or part thereof, such as organs, tissues, having a respiration metabolism; this produce can for example be from plants, fruit, vegetables, animals, fungi and micro-organisms.

Where in embodiments of the present invention reference is made to a storage environment, reference is made to any physical enclosure into which the respiratory produce can be placed.

Where in embodiments of the present invention reference is made to "respiration coefficient" or "RQ", reference is made to the proportion of the rate of carbon dioxide production to the rate of oxygen consumption for the metabolic reaction that converts carbohydrates and oxygen to water and carbon dioxide. RQ has a value of 1 for respiration, as far as the biochemical level of the reaction is considered.

Where in embodiments of the present invention reference is made to "gas exchange rate coefficient" or "GERQ", reference is made to the proportion of the rate of removal of carbon dioxide by the produce into the storage environment to the rate of uptake of oxygen by the produce from the storage environment. GERQ can have values from 0.7 to infinity.

Where in embodiments of the present invention reference is made to a "control unit" or "controller", reference is made to a device for controlling the transfer and/or processing data from a computing device to a peripheral device and vice versa, e.g. receiving and processing the data acquired from the confined storage environment.

Where in embodiments of the present invention reference is made to "operating/actuating means" or "operating means" or "actuating means", reference is made to a means for adapting or controlling a gas medium in the confined storage environment, e.g. in agreement with a determined adjusted gas medium composition. Such a system may be operated in an automated way based on control signals from the control unit or it may be operated by an operator based on an output of control signals from the control unit.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 2:
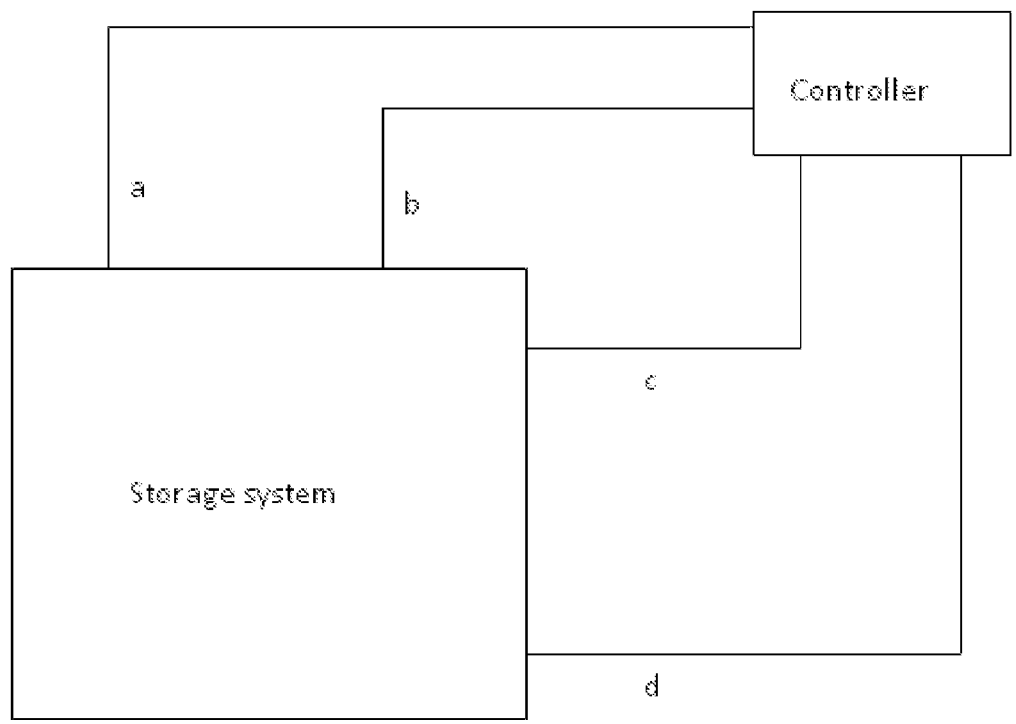
FIG. 2 is a schematic view showing the details of a control system based on a software assisted measurement system and control algorithm according to an embodiment of the present invention, wherein the gas analyzing means measures $O_2$ (a) and $CO_2$ (b) concentrations and these measured $O_2$ and $CO_2$ results are used to calculate GERQ. According to an embodiment of the present invention, the calculated GERQ is compared to the set point value of GERQ or its differential (c) and the $CO_2$ level is compared to the maximum tolerable concentration of the fruit (d).

In a first aspect, the present invention relates to a control system and method for controlling the storage of respiratory produce in a defined confined storage environment. The defined confined storage environment may be for example a room, a container, a box, a bin, a bag, a pallet bag, a conditioned storage deck on a ship, a conditioned trailer and a truck. The respiratory produce may be any as described above, such as for example plant organs such as fruits, vegetables and flowers or entire plants. The confined storage environment may be subject to variation due to a variation factor on the respiratory produce, due to the confined environment condition or a variation thereof and/or due to storage time. The system comprises at least a gas analyzer or gas analyzing means for determining an adjusted gas medium composition of the confined storage environment wherein the at least one gas analyzing means comprising a control unit. The control system also comprises at least one operating/actuating means for adapting the gas medium in the confined storage environment based on said determined adjusted gas medium composition. The control unit thereby is adapted for determining the adjusted gas medium composition based on a mathematical model of the system that determines the actual respiratory and fermentative rates of the produce and on the evaluation of the gas exchange dynamics of the storage system comprising the gas exchange dynamics of the respiratory produce, the storage atmosphere and the outside. Where reference is made to the gas exchange dynamics of the outside, reference is made to gas leakage from the confined storage environment to the outside. The control system also may also comprise the confined storage environment, thus also forming a storage system, or may co-operate therewith. Referring now specifically to the drawings, a storage system according to an example of an embodiment of the present invention is illustrated in FIG. 1, and the control system is detailed in FIG. 2. The system in FIG. 1 has particular application to controlled atmosphere storage of any type of respiratory produce. The system comprises the storage environment 1, a gas analyzing means, sometimes also referred to as gas analyzer 2, a $CO_2$ scrubber 3, a gas sampling pump 4, a gas pump for the scrubber 5, an air supply 6, an $N_2$ supply 7 and valves for flow control 8, 9, 10, 11, 12, 13. The gas analyzing means according to embodiments of the present invention comprises a control unit 20. The control system may be a software assisted measurement system and control algorithm. In some embodiments, the gas analyzing means measures $O_2$ (a) and $CO_2$ (b) concentrations. These measured $O_2$ and $CO_2$ results in some embodiments are used to calculate GERQ. The calculated GERQ is compared to the set point value of GERQ (c). The air supply valve (d) is used to maintain the required $O_2$ level in the storage environment; so that $GERQ<GERQ_s$ or $dGERQ/dt<(dGERQ/dt)_s$ and the $O_2$ concentration should not be higher than the optimum storage concentration that is recommended for the static storage environment. The subscript s stands for the set point. Whenever the $CO_2$ concentration is larger than the set point value of $CO_2$ (d), the gas from the storage environment is circulated through the scrubber using the gas pump (5), until it reaches the required $CO_2$ concentration. During scrubbing valve 10, 11 and 13 are closed. The $CO_2$ scrubbing is followed by regenerating the scrubber using $N_2$ flushing. During the regeneration period valve 11 and 13 are open while valve 9, 10 and 12 are closed. When the need arises, valve 10 is used to flush the container with $N_2$, particularly during startup of the experiment for fast reduction of $O_2$ concentration from the atmospheric condition.

By way of illustration, features and advantages of at least some embodiments of the present invention are further discussed below, embodiments of the present invention not being limited thereto. By way of illustration a possible algorithm that may be used or on which some features may be based is illustrated below, embodiments of the present invention not being limited thereby.

Embodiments of the present invention allow reducing the oxygen concentration in the storage environment dynamically to a value as close as possible to 0% allowed by respiratory produce through a software-assisted control of the $O_2$ concentration in the storage environment based on the respiratory metabolism of the produce and the gas exchange dynamics of the storage environment with the external environment:

$$V\frac{dO_2}{dt} = m_p\overline{r_{O_2}} + L_{O_2} \quad [1]$$
$$V\frac{dCO_2}{dt} = m_p\overline{r_{CO_2}} L_{CO_2}$$

where V is the enclosed air volume inside the storage environment, $$\frac{d}{dt}$$

is the rate of change with time t, $O_2$ and $CO_2$ are the oxygen and carbon dioxide concentration, $\overline{r_{CO_2}}$ and $\overline{r_{CO_2}}$ are the rates of uptake of $O_2$ and release of $CO_2$ by the produce, respectively, and $L_{CO2}$ and $L_{CO2}$ are the exchange rates (leaks) of the gasses between the external ambient environment and the storage environment. RQ is defined as the ratio of the $CO_2$ production $r_{CO_2}$ to the $O_2$ consumption rate $r_{O_2}$ due to the metabolic reactions inside the produce:

$$RQ = \frac{r_{CO_2}}{r_{O_2}} \quad [2]$$

and is equal to 1 for respiration, a principle that has been disclosed in literature and holds at the biochemical level of the reaction. Previous literature has only considered adaptive (manual) control based the coefficient $RQ_{eff}$ and set a value of 1 as the threshold between respiration ($RQ_{eff}=1$) and fermentation ($RQ_{eff}>1$):

$$RQ_{eff} = \frac{\frac{dCO_2}{dt}}{-\frac{dO_2}{dt}} = \frac{m_p\overline{r_{CO_2}} - L_{CO_2}}{m_p\overline{r_{O_2}} - L_{O_2}} \quad [3]$$

As the outer right hand side of this equation states, $RQ_{eff}$ is actually a function of leaks. Therefore, $RQ_{eff}$ can always be larger than one, also in safe aerobic respiration conditions (RQ=1), when oxygen leaks exist. Such control system then works in suboptimal conditions.

Leaks and produce dynamics thus need to be taken into account for optimal storage control. For the produce as a whole, GERQ is defined as the average rates of uptake of $O_2$ and release of $CO_2$ by the produce:

$$GERQ = \frac{\overline{r_{CO_2}}}{\overline{r_{O_2}}} \quad [4]$$

and is different from the biochemical RQ, because it also accounts for accumulation of gasses inside the fruits. In the dynamic case, the value of GERQ is actually smaller than 1 due to the relatively large diffusion time constant of the products and the absorption of the gasses (in particular $CO_2$ due its high solubility) in the fruits and other material. Thus, even in low oxygen conditions where fermentation occurs, GERQ can still be smaller than one. Furthermore, GERQ has been observed to increase gradually from ambient oxygen aerobic conditions to low oxygen concentrations. While previous literature has failed to consider the effects of leaks and actual produce GERQ on gas exchange dynamics in the storage environment, the present invention does take these aspects into account for optimal control using the above conservation mass equations for $O_2$ and $CO_2$.

The equation system [1] becomes:

$$V\frac{dO_2}{dt} = m_p\overline{r_{O_2}} + L_{O_2} \quad [5]$$
$$V\frac{dCO_2}{dt} = m_p GERQ\overline{r_{O_2}} - L_{CO_2}$$

One embodiment of the present invention is a control system that adapts the flow of oxygen into the storage environment using the measurement of leaks and GERQ in aerobic conditions and anaerobic conditions. This system can continuously adapt the flow rate of oxygen into the storage room. The control system of the present example works as follows.
1. Produce is loaded into the storage environment and the temperature is decreased to a low steady value.
2. When the temperature is steady, the $O_2$ and $CO_2$ concentrations in the storage environment are measured as a function of time. At at least 2 different concentration levels of $O_2$ in the higher aerobic range ($>10\% O_2$), the following equation system is solved to obtain leak rates L/V and the aerobic value of GERQ $$L_{O_2}/V = k(O_2^{ext} - O_2^{int}) = k\Delta O_2$$

$$L_{CO_2}/V = k(CO_2^{int} - CO_2^{ext}) = k\Delta CO_2 \quad [7]$$

with k the leak transfer rate constant, characteristic of the storage environment at the time of storage. Using equations (5), k equals $$k = \frac{\frac{dCO_2}{dt} + GERQ\frac{dO_2}{dt}}{GERQ\Delta O_2 - \Delta CO_2} \qquad [8]$$

and is calculated using the measured concentrations and rates, together with the average aerobic value of GERQ in the range of measurement.

3. The oxygen concentration in the storage environment is allowed to decrease further (naturally using the respiration of the produce, or, preferably because it is faster, mechanically by flushing the storage environment with nitrogen gas).
4. At low oxygen concentration (>1%), the respiration of the produce is used to allow the oxygen concentration to decrease further. The values and rates of change of oxygen and carbon dioxide concentration with time are continuously measured and recorded. The instantaneous GERQ is calculated as $$GERQ = \frac{\left(\frac{dCO_2}{dt} + k\Delta CO_2\right)}{\left(-\frac{dO_2}{dt} + k\Delta O_2\right)} \qquad [9]$$

5. A control algorithm calculates the rate of oxygen supply into the room when the gas exchange rate quotient deviates sharply from the aerobic GERQ. The algorithm can use both the calculated value of GERQ or the rate of change with time of GERQ. $CO_2$ is regularly scrubbed from the air in the storage environment to keep it at a safe level.

The control system is robust against complicating factors (changes in temperature, humidity, aging of the produce).

The actual implementation of this system is a considerable reduction in storage room management efforts.

The actual implementation of this control system can be used for all types of storage environments such as rooms, containers, boxes, bins, bags, pallet bags, conditioned storage decks on ships, conditioned trailers and trucks of all dimensions.

In one aspect, the present invention also relates to the use of a control system as described in the first aspect or a particular embodiment thereof. Such a use may be for monitoring the respiration and/or fermentation activity of the produce, for controlling the oxygen concentration dynamically to the lowest possible value allowed by respiratory produce or the $CO_2$ concentration dynamically to the highest possible value allowed by the respiratory produce, for protecting the stored respiratory produce against fermentative degradation, for modifying the storage environment to a suitable level for the particular batch of fruits in the storage environment as it changes with the storage time, for dynamically controlling the gas composition in the atmosphere of confined storage environment or for dynamically controlling through a software-assisted monitoring of the rates of oxygen consumption and carbon dioxide change.

The present invention in one aspect also relates to a method of monitoring and controlling a process of storage of a respiratory produce for monitoring and controlling the respiration activity of the produce. The method comprises determining an adjusted gas medium for the confined storage environment based on a mathematical model of the system that determines the actual respiratory and fermentative rate of the produce and on the evaluation of the gas exchange dynamics of the storage system comprising the gas exchange dynamics of the respiratory produce, the storage atmosphere and the outside, for example gas leakage to the outside. The method also comprises using said determined adjusted gas medium composition for controlling of gas composition in the storage device.

In one aspect, the present invention also relates to a computer-implemented method for performing at least part of the methods as described above or to corresponding computing program products. In one embodiment such a computing program product may be a control unit or controller developed as software. The computing program product also may be a computing device comprising computer code executable on such a processor. Computer implemented methods may be implemented in such a computing system, such as for example a general purpose computer. The computing system may comprise an input means for receiving data. The system may be or comprise a data processor for processing data, e.g. a mathematical model for determining actual respiratory and fementative rates of the produce or an algorithm for determining and/or evaluating the gas exchange dynamics of the storage system. The computing system may include a processor, a memory system including for example ROM or RAM, an output system such as for example a CD-rom or DVD drive or means for outputting information over a network. Conventional computer components such as for example a keyboard, display, pointing device, input and output ports, etc also may be included. Data transport may be provided based on data busses. The memory of the computing system may comprise a set of instructions, which, when implemented on the computing system, result in implementation of part or all of the standard steps of the methods as set out above and optionally of the optional steps as set out above. Therefore, a computing system including instructions for implementing part or all of a method as described above is not part of the prior art.

Further aspect of embodiments of the present invention encompass computer program products embodied in a carrier medium carrying machine readable code for execution on a computing device, the computer program products as such as well as the data carrier such as dvd or cd-rom or memory device. Aspects of embodiments furthermore encompass the transmitting of a computer program product over a network, such as for example a local network or a wide area network, as well as the transmission signals corresponding therewith.

It will be apparent to those skilled in the art that various modifications and variations can be made in construction of the system and method without departing from the scope or spirit of the invention.

For example, the present invention also relates to a control system for controlling the storage of respiratory produce, particularly fruit, vegetables and plants, in a defined confined storage environment in each case of variation factor on respiratory produce, on confined environment condition and/or storage time; The control system comprises an operating/actuating means for adapting the gas composition in the confined storage environment and at least one gas analyzing means for determining an adjusted gas medium of the confined storage environment, wherein the gas analyzing means comprises at least one control unit having a computer readable medium tangibly embodying computer code executable on a processor. The adjusted gas medium thereby may be determined by systems evaluation of the gas exchange dynamics of the complete storage system including the gas exchange dynamics of respiratory produce, the storage atmosphere and the outside (gas leakage to the outside). In another example, the present invention relates to a system wherein the adjusted gas medium is being determined as a function of the proportion of rate of removal of carbon dioxide by the produce into the storage environment to the rate of uptake of oxygen by the produce from the storage environment. In yet another example, the present invention relates to a control system wherein the adjusted gas medium is being determined as a function of the calculated total gas exchange rate quotient (GERQ) in the confined storage environment.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

EXAMPLE 1

Variation of GERQ with Decreasing Oxygen Concentration

Figure 3:
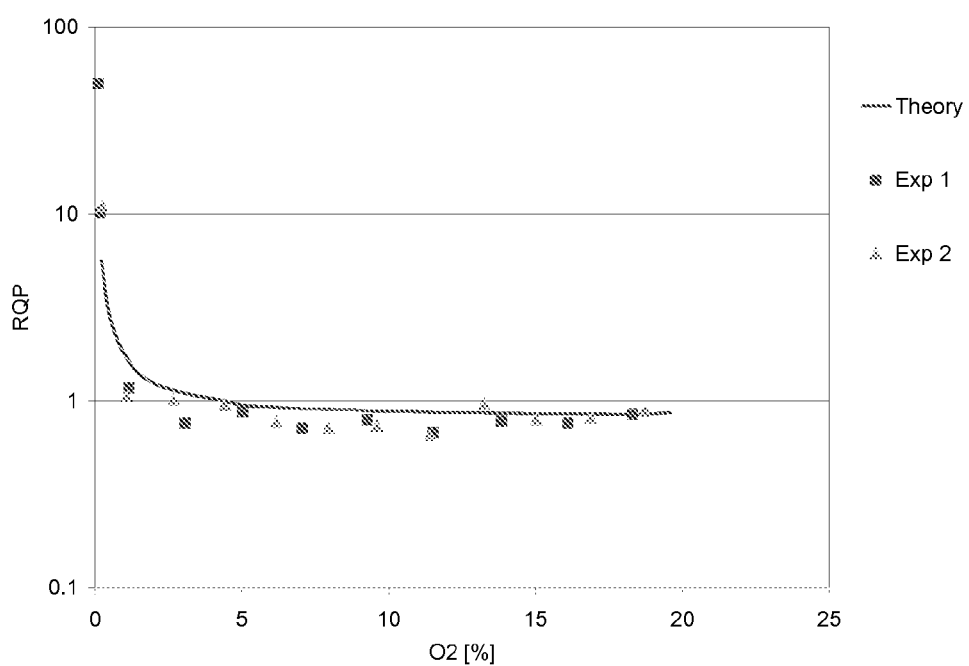
FIG. 3 plots the product gas exchange rate quotient of Kanzi apples as a function of oxygen concentration in the storage environment; jar experimental and theoretical values are shown, illustrating features of the product gas exchange rate coefficient as can be used in embodiments of the present invention.

This example demonstrates the difference between the RQ of the biochemical reaction and the gas exchange rate quotient, GERQ. The respiration and the gas diffusion and permeation parameters of small samples of cortex and skin tissue of the apple cultivar Kanzi were measured and are given in tables 1 and 2. The measured RQ was equal to 1. Next, respiration experiments were conducted on intact fruit in air-tight jars (no leaks) to determine the GERQ using the measurement method of present invention. The measurements will confirm the whole produce response including diffusion and absorption of gasses that is confirmed by a theoretical model of the diffusion-permeation-reaction inside the produce using the tissue parameters in tables 1 and 2 with RQ equal to 1. Two repetitions were made. FIG. 3 displays the measured GERQ in the jar as a function of oxygen concentration.

The value of GERQ is smaller than 1 in high $O_2$ concentration, increases steadily with decreasing $O_2$ concentration, and increases significantly when the $O_2$ concentration decreases below 1%, while the biochemical RQ (see table) is constant and equal to 1. The measured GERQ takes into account the dynamics of the produce and predicts the onset of fermentation correctly; the measurement confirms the theoretical response.

TABLE 1

Respiration model parameter estimates of cortex respiration and their 95% confidence interval. ($V_{m,O2}$ and $V_{m,f,CO2}$ results measured at 293° K.)

| Parameters | | Kanzi cortex |
|---|---|---|
| $V_{m,O2}$ | ($\times 10^4$ mol m$^{-3}$ s$^{-1}$) | 1.7 ± 0.12 |
| $E_{a,Vm,O2}$ | (kJ mol$^{-1}$) | 77.8 ± 16 |
| $K_{m,O2}$ | (kPa) | 0.61 ± 0.24 |
| $K_{mn,CO2}$ | (kPa) | 168 ± 212 |
| $V_{m,f,CO2}$ | ($\times 10^4$ mol m$^{-3}$ s$^{-1}$) | 2.1 ± 0.16 |
| $E_{a,V,f,CO2}$ | (kJ mol$^{-1}$) | 68.4 ± 11.4 |
| $K_{m,f,O2}$ | (kPa) | 0.78 ± 0.37 |
| RQ | | 1.03 ± 0.1 |
| $R^2_{adj}$ | | 0.94 |

TABLE 2

Mean gas diffusivity D and gas permeability K of respiratory gasses in Kanzi apple cortex and skin and 95% confidence interval of the mean.

| Tissue | radial position x with respect to diameter R | $D_{O2}$ ($\times 10^{-9}$ m$^2$ s$^{-1}$) | $D_{CO2}$ ($\times 10^{-9}$ m$^2$ s$^{-1}$) | K ($\times 10^{-17}$ m$^2$) |
|---|---|---|---|---|
| Cortex | 0.35 < x/R < 0.65 | 2.73 ± 1.59 | 18.1 ± 7.8 | 6.94 ± 5.77 |
| | x/R > 0.65 | 5.05 ± 1.14 | 25.0 ± 9.11 | |
| Skin | x/R = 1 | 0.31 ± 0.11 | 0.98 ± 0.44 | 0.27 ± 0.12 |

EXAMPLE 2

Taking into account the dynamics of the storage environment

We illustrate the invention characterized in that it takes into account the state of operation of the storage environment as part of the control system. To this end we consider apple storage in a storage room of 10 m depth, 5 m width and 5 m height, in which 50 tons of apples (cv. Jonagold) are stored. The true respiration kinetics of the apples were determined in air-tight jar tests and GC analysis of the head space gas concentrations. The apples were characterized by a non-competitive inhibition Michaelis-Menten kinetics:

$$R_{O2} = -\frac{V_{m,O2} \cdot P_{O2}}{(K_{m,O2} + P_{O2}) \cdot \left(1 + \frac{P_{CO2}}{K_{mn,CO2}}\right)}$$

with $V_{m,O2}$ (mol m$^{-3}$ s$^{-1}$) the maximum oxygen consumption rate, $P_{O2}$ (kPa) the $O_2$ partial pressure, $P_{CO2}$ (kPa) the $CO_2$ partial pressure, $K_{m,O2}$ (kPa) the Michaelis-Menten constant for $O_2$ consumption, $K_{mn,CO2}$ (kPa) the Michaelis-Menten constant for non-competitive $CO_2$ inhibition, and $R_{O2}$ (mol m$^{-3}$ s$^{-1}$) the $O_2$ consumption rate of the apples. The equation for production rate of $CO_2$ comprises an oxidative respiration part and a fermentative part:

$$R_{CO2} = -r_{q,ox} \cdot R_{O2} + \frac{V_{m,f,CO2}}{\left(1 + \frac{P_{O2}}{K_{m,f,O2}}\right)}$$

with $V_{m,f,CO2}$ (mol m$^{-3}$ s$^{-1}$) the maximum fermentative $CO_2$ production rate, $K_{m,f,O2}$ (kPa) the Michaelis-Menten constant of $O_2$ inhibition on fermentative $CO_2$ production, $r_{q,ox}$ the respiration quotient at high $O_2$ partial pressure, and $R_{CO2}$ (mol m$^{-3}$ s$^{-1}$) the $CO_2$ production rate of the sample.

The effect of temperature was described by Arrhenius' law:

$$V_{m,O2} = V_{m,O2,ref} \exp\left[\frac{E_{a,VmO2}}{R}\left(\frac{1}{T_{ref}} - \frac{1}{T}\right)\right]$$

$$V_{m,f,CO2} = V_{m,f,CO2,ref} \exp\left[\frac{E_{a,VmfCO2}}{R}\left(\frac{1}{T_{ref}} - \frac{1}{T}\right)\right]$$

with $V_{m,O2}$ (mol m$^{-3}$ s$^{-1}$) and $V_{m,f,CO2,ref}$ (mol m$^{-3}$ s$^{-1}$) the maximal $O_2$ consumption rate and maximal fermentative $CO_2$ production rate at $T_{ref}$=293° K, respectively; $E_{a,VmO2}$ (kJ mol$^{-1}$) the activation energies for $O_2$ consumption; $E_{a,VmfCO2}$ (kJ mol$^{-1}$) the activation energies for fermentative $CO_2$ production; T (K) temperature; and R (8.314 J mol$^{-1}$ K$^{-1}$) the universal gas constant. Respiration model parameters were estimated by fitting the model equations to the experimental data using nonlinear least square estimation (Table 3). It is noted that $r_{q,ox}$ is the lumped respiration coefficient of the intact apples, determined from respiration jar experiments. It is constant, but smaller than 1 (0.875).

TABLE 3

Respiration model parameter estimates of Jonagold apple respiration and their 95% confidence interval.
($V_{m,O2}$ and $V_{m,f,CO2}$ results measured at 274° K.)

| Parameters | Jonagold apple |
|---|---|
| $V_{m,O2}$ (×10$^5$ mol m$^{-3}$ s$^{-1}$) | 5.5 ± 0.16 |
| $E_{a,Vm,O2}$ (kJ mol$^{-1}$) | 52.9 ± 4.1 |
| $K_{m,O2}$ (kPa) | 0.23 ± 0.04 |
| $K_{mn,CO2}$ (kPa) | 188 ± 217 |
| $V_{m,f,CO2}$ (×10$^5$ mol m$^{-3}$ s$^{-1}$) | 9.4 ± 0.68 |
| $E_{a,Vm,f,CO2}$ (kJ mol$^{-1}$) | 52.3 ± 7.8 |
| $K_{m,f,O2}$ (kPa) | 0.16 ± 0.03 |
| RQ | 0.87 ± 0.05 |

Figure 4:
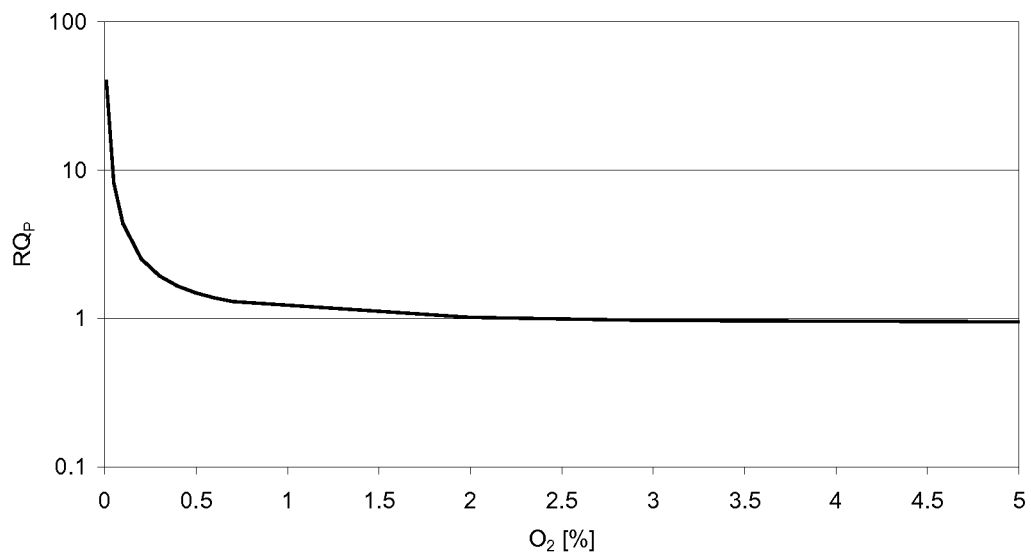
FIG. 4 plots the product gas exchange rate quotient of Jonagold apples as a function of oxygen concentration, illustrating features of the product gas exchange rate coefficient as can be used in embodiments of the present invention.

The GERQ for this batch of apples was smaller than 1 in ambient gas conditions (GERQ=0.888 at 21% $O_2$ and 1° C.) and increased steadily with decreasing $O_2$ concentration. An exponential increase in GERQ was seen below 0.5% $O_2$ (FIG. 4). The 50 tons of apples were loaded into a CA storage room that is equipped with the control system. The leak transfer rate constant of the room was equal to 1.78×10$^{-7}$ s$^{-1}$. The leak rate equals 6% of the $O_2$ consumption of the produce at 20% $O_2$, but more than 60% at 10% $O_2$ and over 100% below 4% $O_2$. This example demonstrates that the current invention will control the optimal conditions of the fruit, without being affected by the leak. To demonstrate this unique feature, two control systems are applied: the first one that does not take into the storage room characteristics (neglecting the leak), the second one is the present invention.

Figure 5:
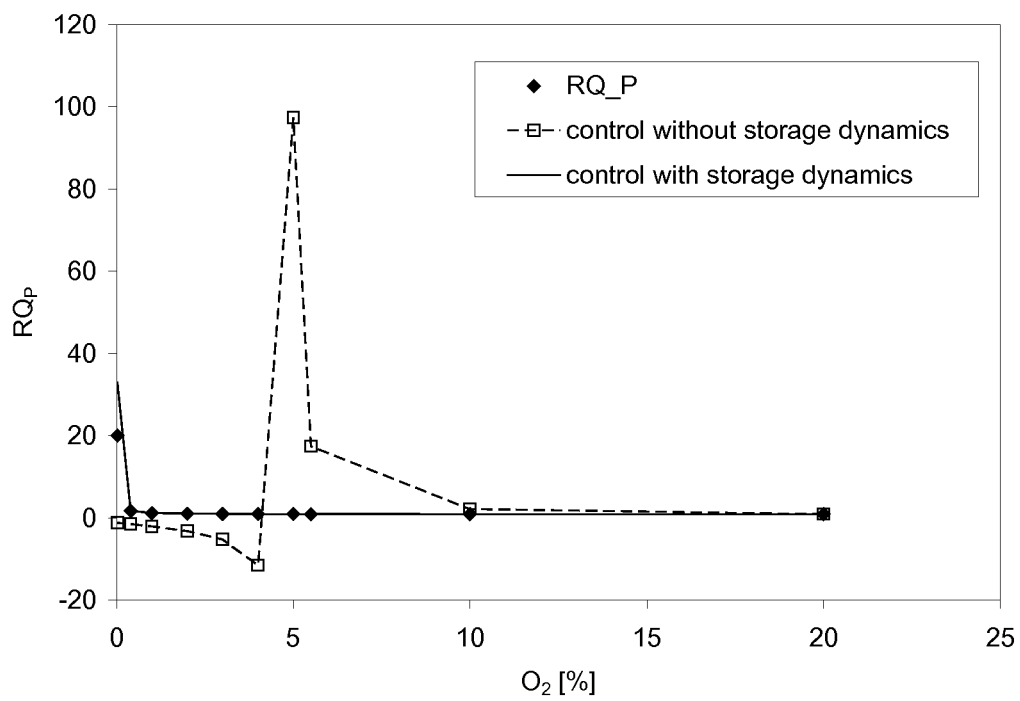
FIG. 5 plots the gas exchange rate quotient of apples in a storage room with large leaks, illustrating that for dynamic control of the oxygen concentration the storage dynamics advantageously are taken into account due to large leakage rates, according to an embodiment of the present invention.

FIG. 5 plots the GERQ as a function of the $O_2$ concentration and the calculated values of the 2 control systems. Not taking into the leaks will lead to severely erroneous results that cannot be used for optimal storage control. In the example, the controller without storage dynamics will keep the oxygen concentration above 5% or will fail.

Figure 6:
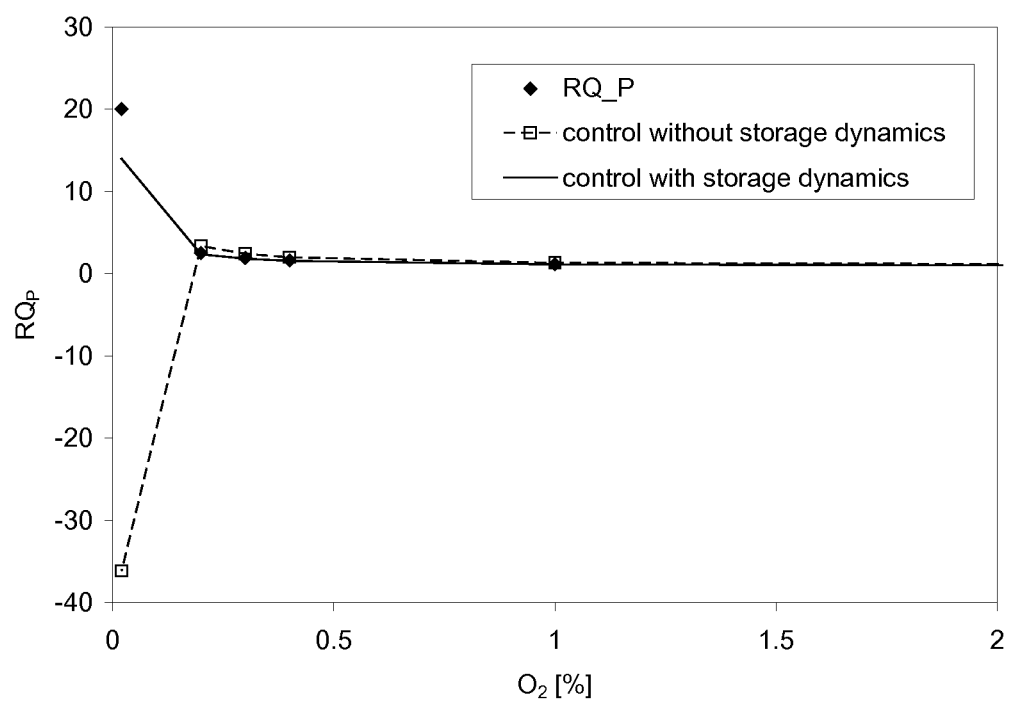
FIG. 6 plots the gas exchange rate quotient of apples in a storage room with small leaks, illustrating that for dynamic control of the oxygen concentration the storage dynamics advantageously are taken into account due to large leakage rates, according to an embodiment of the present invention.
Figure 7A:
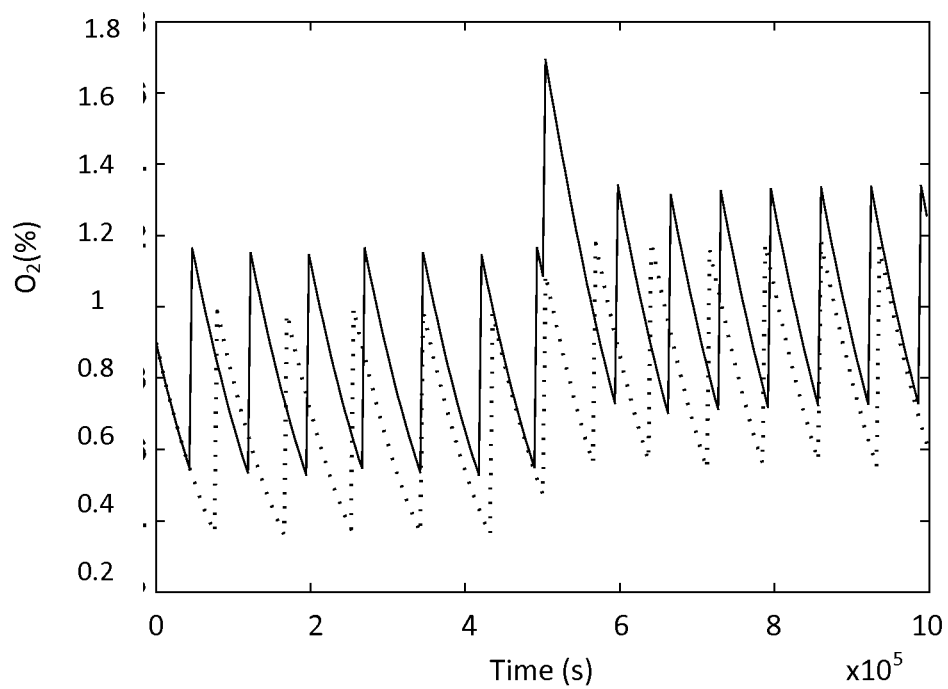
FIG. 7 demonstrates an example of an on/off control of Jonagold apple storage in a container with leaks where the apple physiological state changes at time $5 \times 10^5$ s, illustrating features of embodiments according to the present invention. The solid line (—) is the control when the leakage is not included in the control, the dot line ( . . . ) plots the values when the leakage is included. The control set point in the present example is based on the derivative of the gas exchange rate quotient, $$\frac{dRQ_p}{dt} = 1 \times 10^{-5}.$$
Figure 7B:
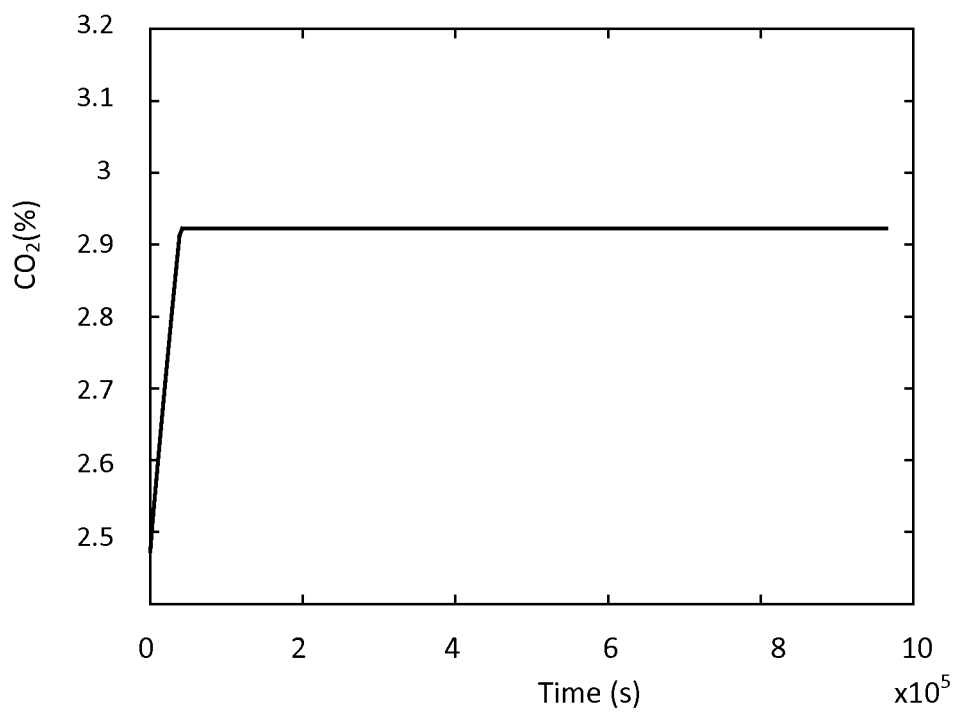
Figure 7C:
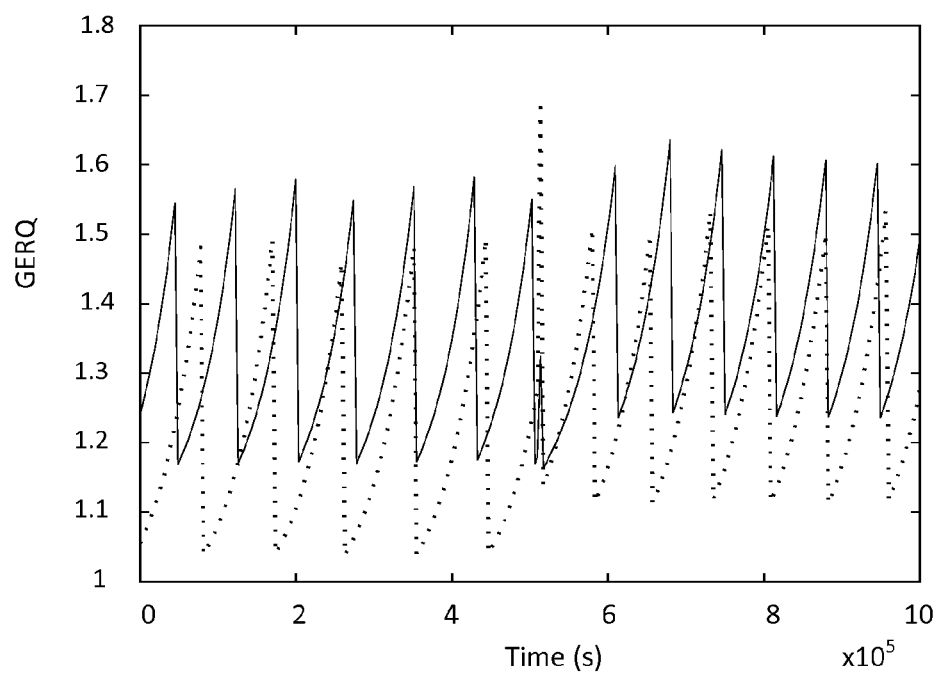
Figure 7D:
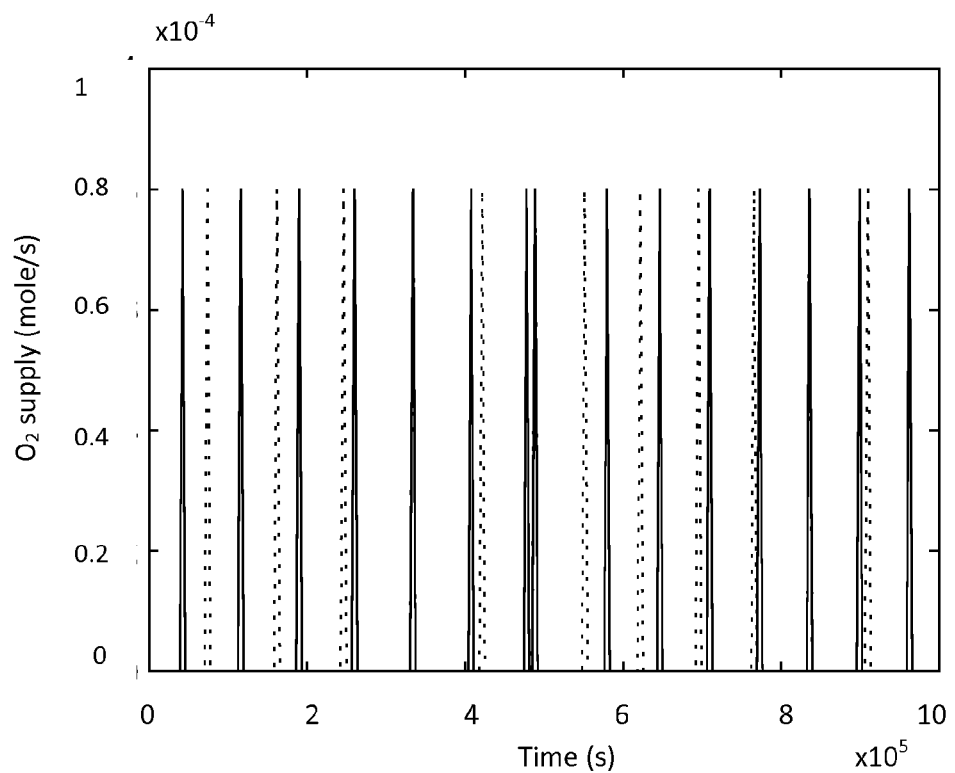
Figure 8A:
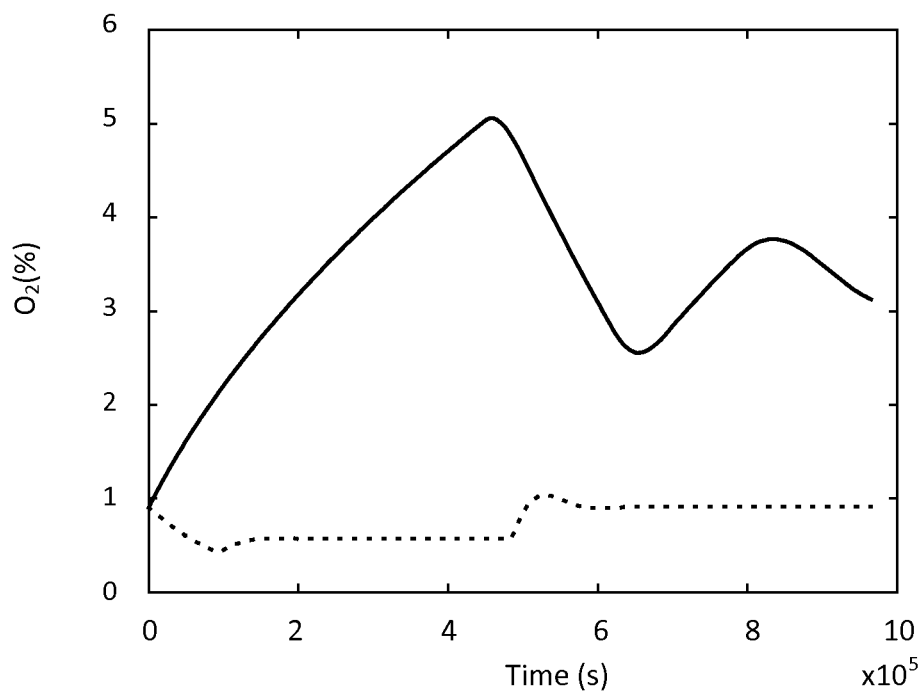
FIG. 8 shows an example of a PID control of Jonagold apple storage in a container with leaks where the apple physiological state changes at time $5 \times 10^5$ s, illustrating features of embodiments according to the present invention. The solid line (—) is the control action when the leakage is not included, the dot line ( . . . ) plots the values when the leakage is included and proper levels of oxygen are reached. The control set point in the present example uses a threshold value of GERQ; GERQ=1.2.
Figure 8B:
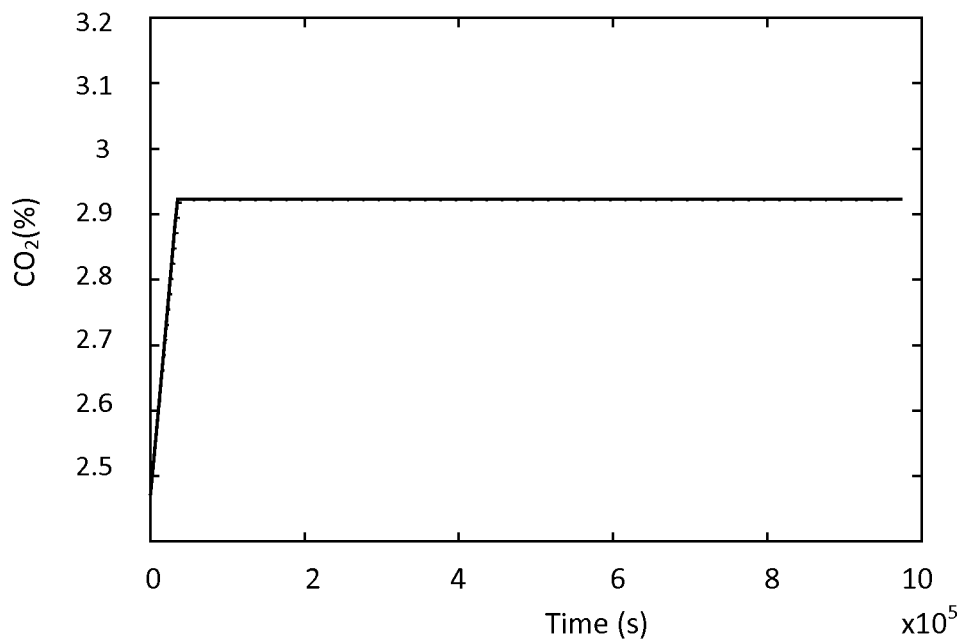
Figure 8C:
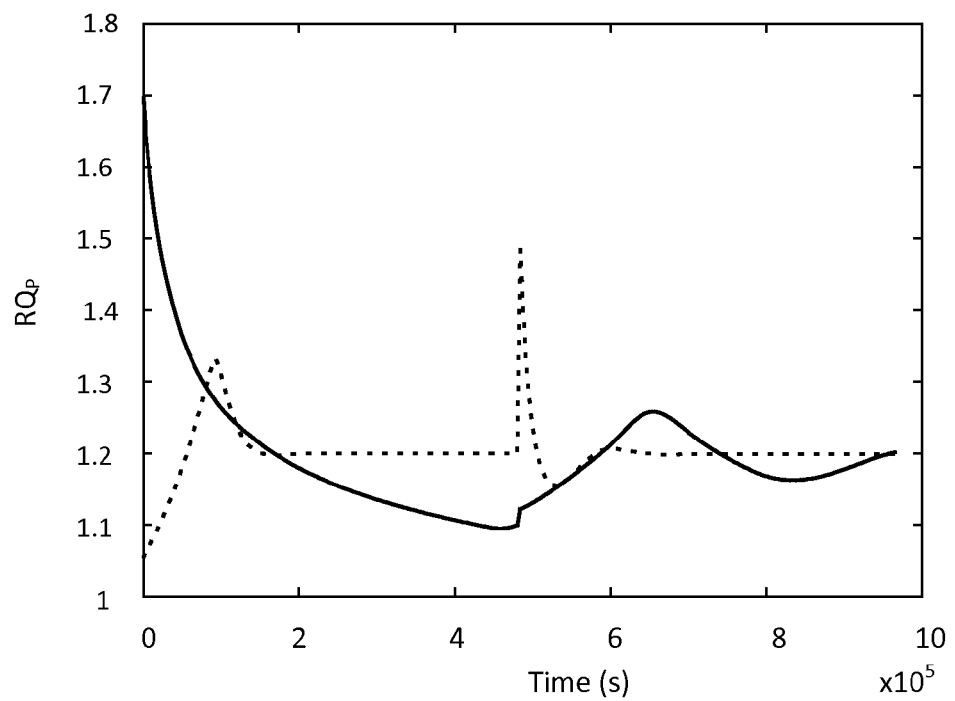
Figure 8D:
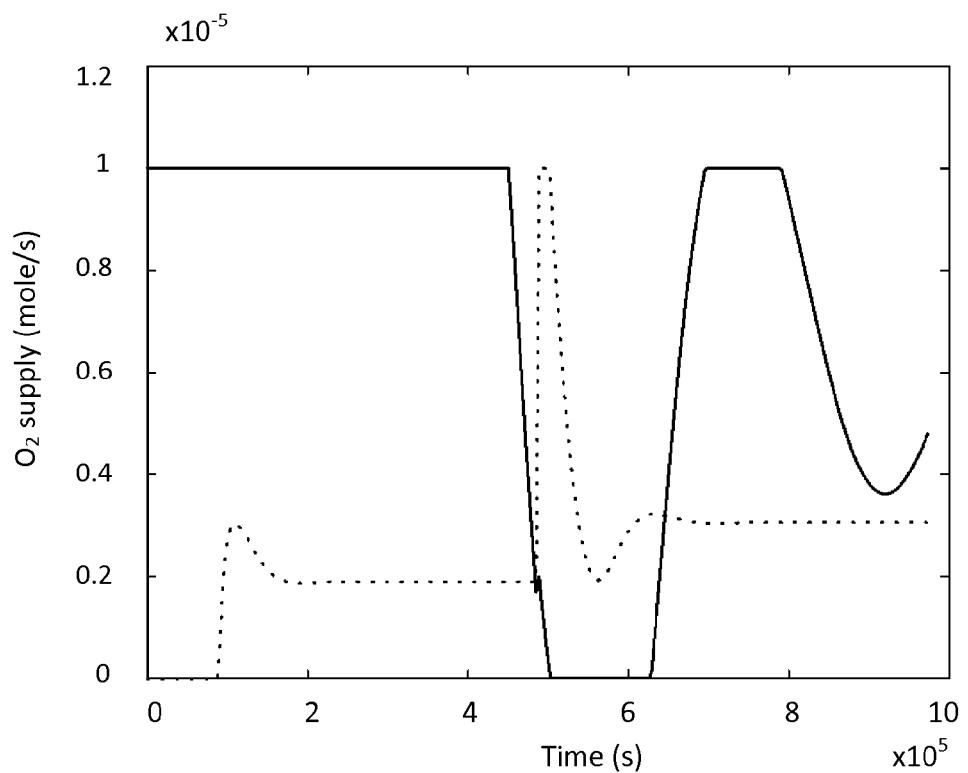

Even when leaks are small, they contribute significantly to the low oxygen dynamics of the storage environment. FIG. 6 illustrates that the only the present invention will lead to optimal control in the critical region of ultra low oxygen concentrations (leak rate constant=1.78×10$^{-8}$ s$^{-1}$).

EXAMPLE 3

Dynamically Controlled Apple Storage in a Container Using the Rate of Change of GERQ with an on-Off Controller This example illustrates the use of an on-off controller based on the rate of change of GERQ. The $CO_2$ level is kept at a constant level of 2.9% by scrubbing the air in the container. 80 kg of Jonagold apples are loaded in a 500 L airtight container. The $O_2$ level fluctuates between the an maximum set level of 0.95% and the lowest possible level at $dRQ_P/dt<1.5×10^{-5}$ s$^{-1}$. Instead of the recommended static 1% $O_2$, this control system allows to maintain an average value of 0.62% without causing fermentative deterioration of the fruit.

The average respiration rate equals 4.70×10$^{-6}$ mol m$^{-3}$ s$^{-1}$, which is 14.52% lower than in the static case. FIG. 7 shows the profiles of oxygen and carbon dioxide concentrations in the container and the value of the gas exchange rate quotient that increases with decreasing oxygen. The on-off controller makes sure that oxygen levels do not decrease below a safe level according to the dynamic state of the apples: when the physiological state changes at time 5×10$^5$ s, the controller adapts the atmosphere to increase oxygen concentration according to the changed measured GERQ signal of the product. Not taking into account the leakage of the storage environment results in suboptimal oxygen concentration.

EXAMPLE 4

Dynamically Controlled Apple Storage in a Container Using the a Set Value of GERQ with a PID Controller This example illustrates the use of a PID controller based on a set point value for GERQ. The $CO_2$ level is kept at a constant level of 2.9% by scrubbing the air in the container. 80 kg of Jonagold apples are loaded in a 500 L airtight container. The $O_2$ is kept at the lowest possible level at $RQ_P<1.2$. Instead of the recommended static 1% $O_2$, this control system allows to maintain a value of 0.57% without causing fermentative deterioration of the fruit. The respiration rate in this case equals 4.52×10$^{-6}$ mol m$^{-3}$ s$^{-1}$, 18.21% lower than the static case.

FIG. 8 shows the profiles of oxygen and carbon dioxide concentrations in the container and the value of the gas exchange rate quotient that increases with decreasing oxygen. The PID controller maintains low and safe oxygen levels according to the dynamic state of the apples: when the physiological state changes at time 5×10$^5$ s, the controller adapts the atmosphere to increase oxygen concentration according to the changed measured GERQ signal of the product. Apparent from FIG. 7 is also that when the leakage is not taken into account, this will result in very high values of estimated GERQ, with the result that the controller will supply additional oxygen into the container. In this case, the oxygen levels will be far from the optimum value and respiratory degradation will take place.

EXAMPLE 5

Figure 9:
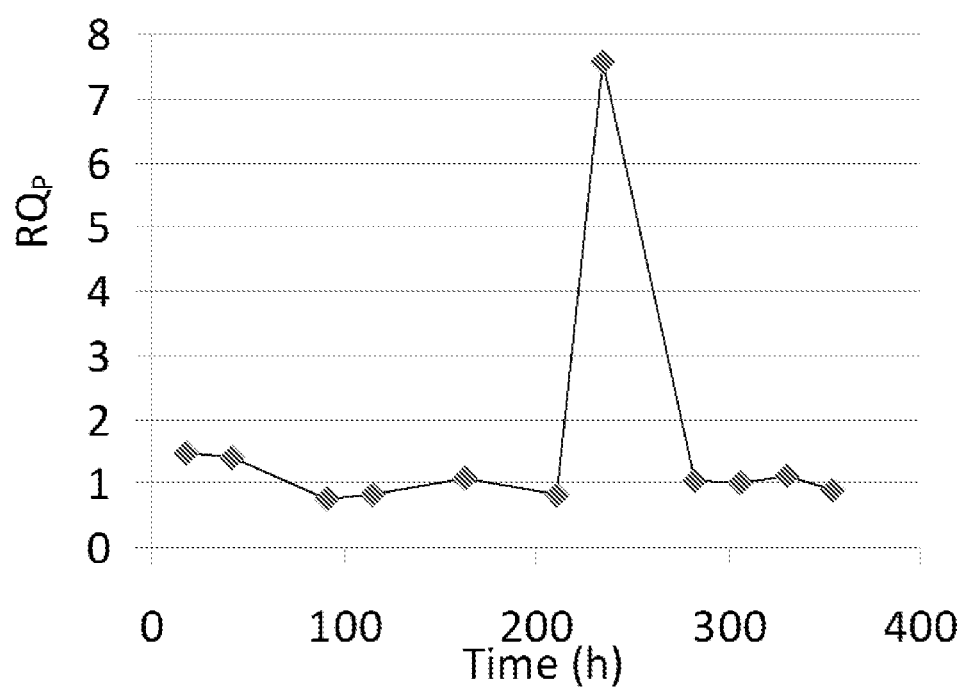
FIG. 9 plots oxygen and carbon dioxide concentrations as a function of time for an example of a container with 80 kg of Jonagold apples and the corresponding value of the gas exchange rate quotient. An on-off control strategy according to an embodiment of the present invention is implemented that opens the air valve when GERQ>2.

Dynamically Controlled Apple Storage in a Container Using the a Set Value of GERQ with an on-Off Controller This example illustrates the use of an on-off controller based on a set point value for GERQ. The $CO_2$ level is kept at a constant level below 3% by scrubbing the air in the container. 80 kg of Jonagold apples are loaded in a 500 L airtight container. The $O_2$ is kept at the lowest possible level at $RQ_P<2.0$. Instead of the recommended static 1% $O_2$, this control system allows to achieve a value of 0.2% without causing fermentative deterioration of the fruit batch (FIG. 9).

The invention claimed is:
1. A control system for controlling the storage of respiratory produce in a defined confined storage environment, said control system comprising:
  at least one gas analyzer comprising a control unit arranged to determine an adjusted gas medium composition of the confined storage environment for protecting the produce against fermentative degradation;

and at least one operator/actuator arranged to adapt the gas medium in the confined storage environment based on said determined adjusted gas medium composition;

wherein the control unit is arranged to determine the adjusted gas medium composition based on a mathematical model of the system that determines the actual respiratory and fermentative rates of the produce and on the evaluation of the gas exchange dynamics of the storage system comprising the gas exchange dynamics of the respiratory produce, the storage atmosphere and the outside, the adjusted gas medium composition being determined as a function of the calculated total gas exchange rate quotient (GERQ) in the confined storage environment, whereby GERQ is calculated as $$GERQ = \frac{\left(\frac{dCO_2}{dt} + k\Delta CO_2\right)}{\left(-\frac{dO_2}{dt} + k\Delta O_2\right)}$$

in aerobic and anaerobic conditions, whereby $$\frac{d}{dt}$$

is the rate of change with time t, $O_2$ and $CO_2$ are the oxygen and carbon dioxide concentration, k is the leak transfer rate constant that is greater than 0 and characteristic of the storage environment at the time of storage, and $\Delta O_2$ is the difference between the concentration of oxygen in the environment and the storage room and $\Delta CO_2$ is the difference between the concentration of carbon dioxide in the storage room and the environment.

2. The control system according to claim 1, wherein said control unit is arranged to continuously determine the adjusted gas medium composition by evaluation of the physiological state of the respiratory produce by the mathematical model of respiration and fermentation of the produce in the storage system combined with continuously and dynamically measured rates of change of concentrations of carbon dioxide and oxygen and taking into account the complete storage system including the storage atmosphere and the outside.

3. The control system according to claim 1, wherein the control unit is arranged to determine the adjusted gas medium composition taking into account measured levels of the rate of gas exchanges of the confined storage environment with the external environment and the accumulation of the gasses in said respiratory produce.

4. The control system according to claim 1, wherein the control unit is arranged to compare the calculated GERQ to the set point value of GERQ, its integral or its differential (c) and wherein the control unit is arranged to compare the $CO_2$ level to the maximum tolerable concentration of the fruit (d).

5. The control system according to claim 1, wherein the control unit is arranged to compare the calculated GERQ to the set point value of GERQ, its integral or its differential (c) and wherein the control unit is arranged to compare the $O_2$ level to the minimal tolerable concentration of the fruit (d).

6. The control system according to claim 1, wherein the at least one gas analyzer comprises a sensor that senses values of $O_2$ concentration (a) and values of $CO_2$ concentration (b) and wherein the at least one gas analyzer is arranged to provide a signal from the control unit to control said operator/actuator to provide the produce with a defined atmospheric medium.

7. The control system according to claim 1, wherein the control unit is arranged to automatically calculate the future gas medium composition required to maintain the respiration of the produce at safe levels and to provide a control signal from the control unit to control the storage room operator or actuator to adapt the gas composition and/or for applying an automated control of gas composition in the storage environment and/or wherein the control unit is configured to predict the fermentation.

8. The control system according to claim 1, wherein the control unit is based on a software assisted measurement system and a control algorithm and/or wherein the control unit comprises a model predictive control (MPC) that automatically calculates the future gas medium composition required to maintain the respiration of the produce at safe levels and/or wherein the control unit comprises a PID controller that automatically calculates the future gas medium composition required to maintain the respiration of the produce at safe levels.

9. The control system according to claim 1, wherein the operator or actuator that adapts the gas medium composition in the confined storage environment comprises a gas flowing device that flows a gas into said confined storage environment and/or a gas scrubber that scrubs a gas from said confined storage environment.

10. The control system according to claim 1, wherein the gas analyzer is arranged to evaluate the gas exchange dynamics of the storage system comprising the respiratory produce, the storage atmosphere, the room design and the gas leakage to the outside.

11. The control system according to claim 1, wherein variation factors that vary the respiratory produce comprise one or more of the group comprising respiratory produce batch, confined environment conditions, time, geographical location, cultivar, cultivar strain, harvest date and storage duration and/or wherein the system is stable to changes in the airtightness and temperature of the storage environment and changes in the ripening stage of the respiratory produce.

12. The control system according to claim 1, wherein the gas analyzer and the operator/actuator is arranged to provide an automated control of gas composition in the storage environment and/or wherein the at least one gas analyzer is arranged to measure, when operational, $O_2$ (a) and $CO_2$ (b) concentrations, wherein the measured $O_2$ and $CO_2$ results are used to calculate GERQ and the calculated GERQ is compared to the maximum allowable value of GERQ (c) and wherein an air supply valve and/or a scrubber and at least one gas pump (d) is used to reduce the $O_2$ level in the storage environment or increase the $CO_2$ level so while $GERQ<GERQ_{max}$ or $dGERQ/dt<(dGERQ/dt)_{max}$.

13. The control system according to claim 1, wherein the control system is arranged to measure $O_2$ and $CO_2$ concentrations in the storage environment as a function of time and to adapt the $O_2$ and $CO_2$ concentration in the confined environment by the flow of oxygen into the confined storage environment, by flushing the storage environment with nitrogen gas, by scrubbing $CO_2$ and/or by respiration of the produce, using the measurement of storage environment leaks and the instantaneous total gas exchange rate quotient (GERQ) and using the rate of change with time of GERQ.

14. The control system according to claim 1, comprising a storage environment, at least one $CO_2$ scrubber, at least one gas sampling pump, at least one gas pump for the scrubber, at least one air supply, at least one $N_2$ supply and/or valves for flow control.

15. The control system according to claim 1, whereby the control system is arranged to regenerate the at least one $CO_2$ scrubber by $N_2$ flushing.

16. The control system according to claim 1, wherein the confined storage environment is selected from the group consisting of a room, a container, a box, a bin, a bag, a pallet bag, a conditioned storage deck on a ship, and a conditioned trailer and a truck.

17. The use of the control system according to claim 1, for monitoring the respiration and/or fermentation activity of the produce and/or for controlling the oxygen concentration dynamically to the lowest possible value allowed by respiratory produce or the $CO_2$ concentration dynamically to the highest possible value allowed by the respiratory produce, and/or for protecting the stored respiratory produce against fermentative degradation and/or for modifying the storage environment to a suitable level for the particular batch of fruits in the storage environment as it changes with the storage time and/or for dynamically controlling the gas composition in the atmosphere of confined storage environment and/or for dynamically controlling through a software-assisted monitoring of the rates of oxygen consumption and carbon dioxide change.

* * * * *